Nov. 5, 1935.  G. A. BRIDGMAN  2,019,557
MAIL CHUTE
Filed March 30, 1934   7 Sheets-Sheet 1
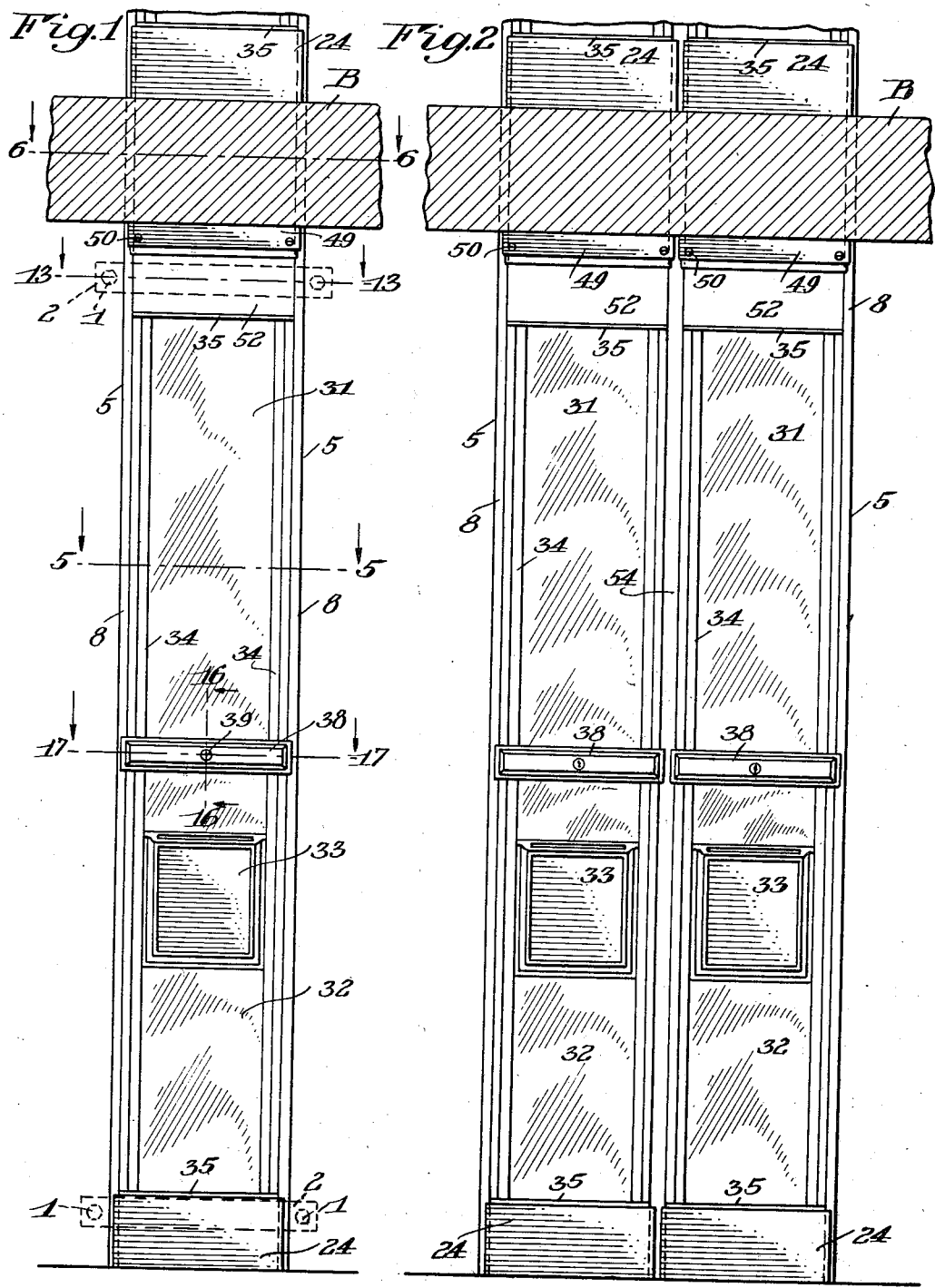
INVENTOR
George A. Bridgman
BY
his ATTORNEY

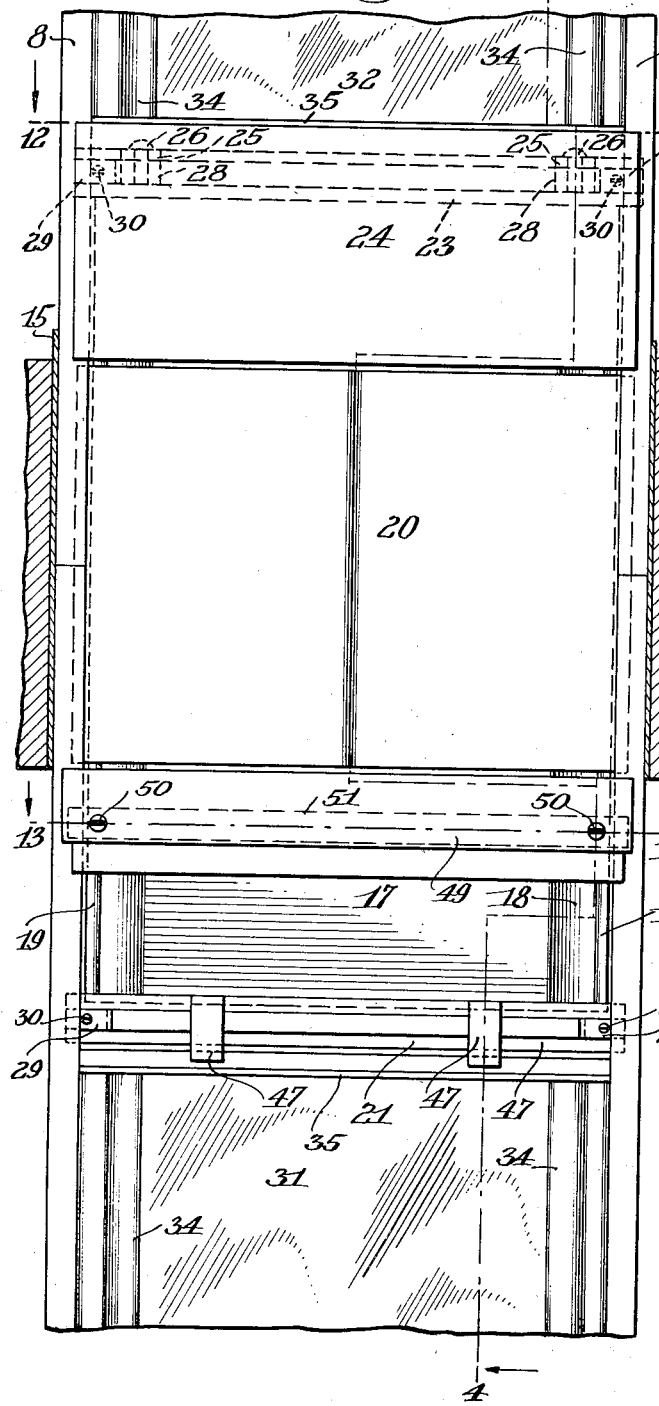

Nov. 5, 1935.                G. A. BRIDGMAN                2,019,557
                                MAIL CHUTE
                           Filed March 30, 1934          7 Sheets-Sheet 3
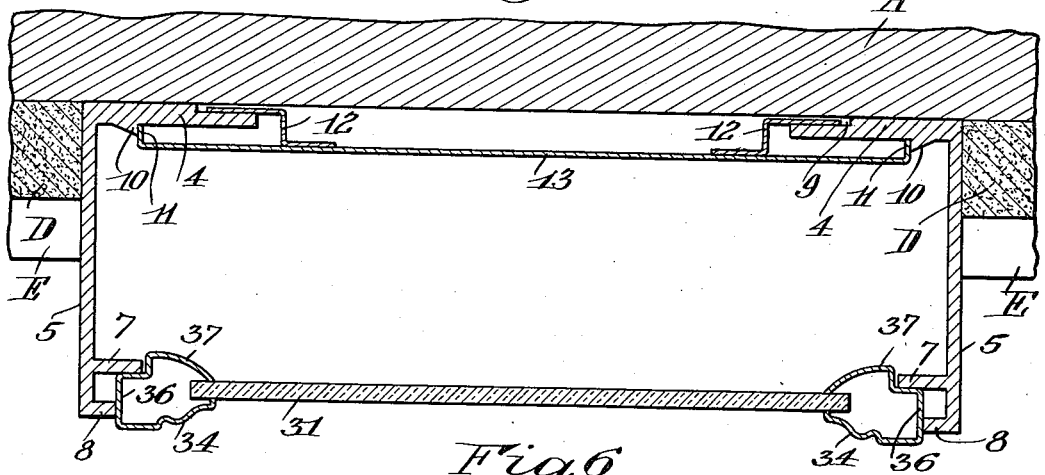
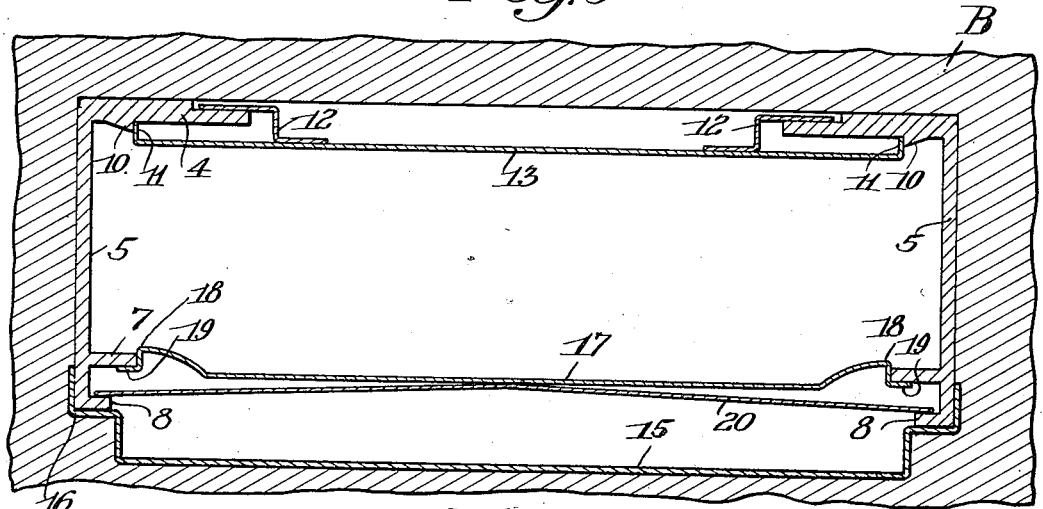
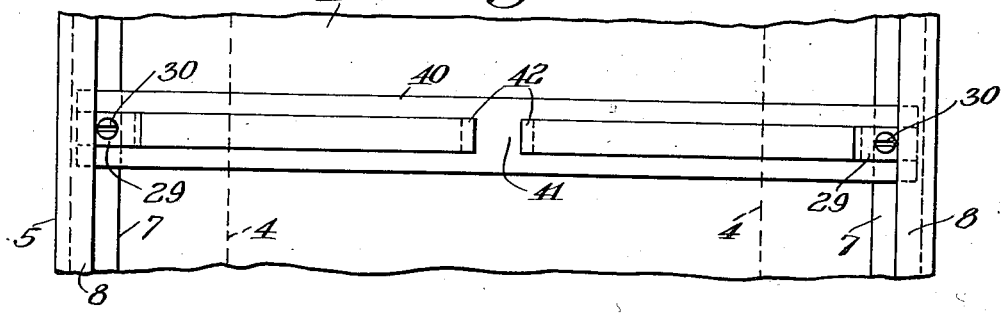
INVENTOR
George A. Bridgman
BY
his ATTORNEY Nov. 5, 1935. G. A. BRIDGMAN 2,019,557
MAIL CHUTE
Filed March 30, 1934 7 Sheets-Sheet 4
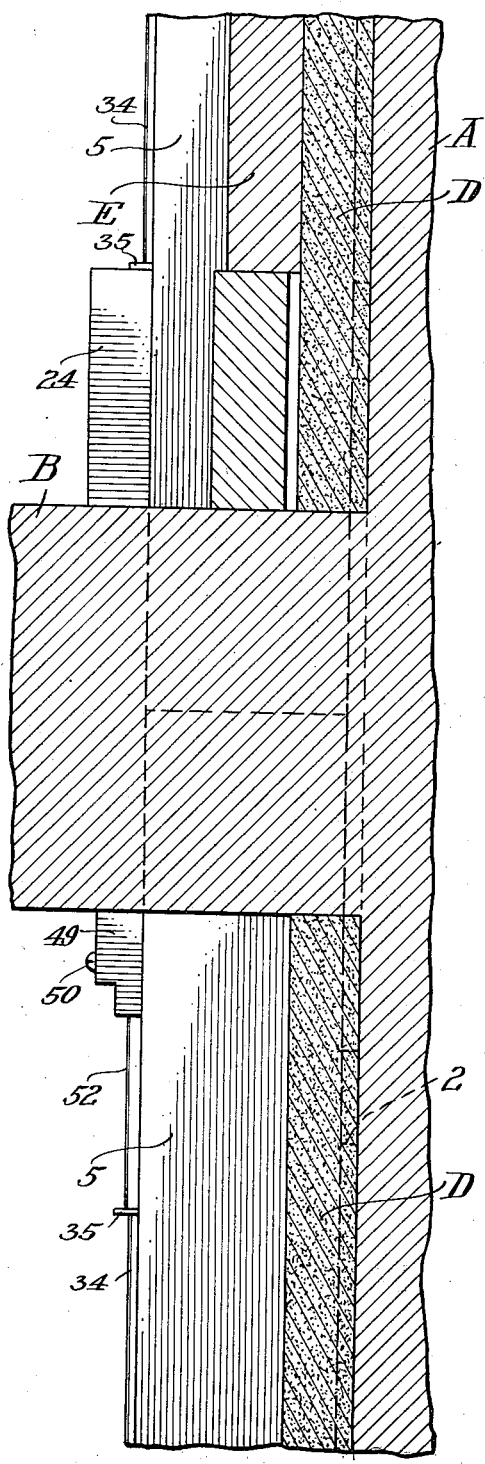
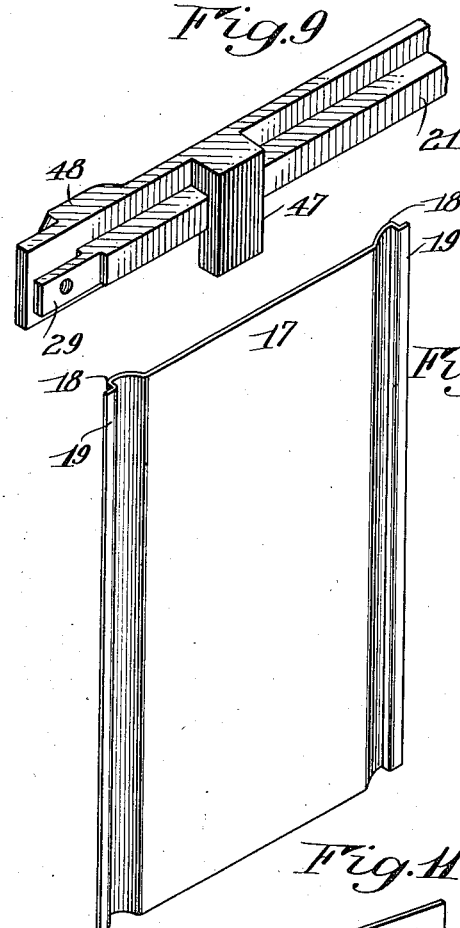
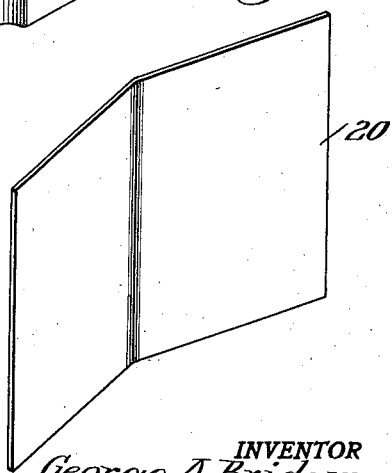
INVENTOR
George A. Bridgman
BY
his ATTORNEY Nov. 5, 1935.    G. A. BRIDGMAN    2,019,557
MAIL CHUTE
Filed March 30, 1934    7 Sheets-Sheet 5
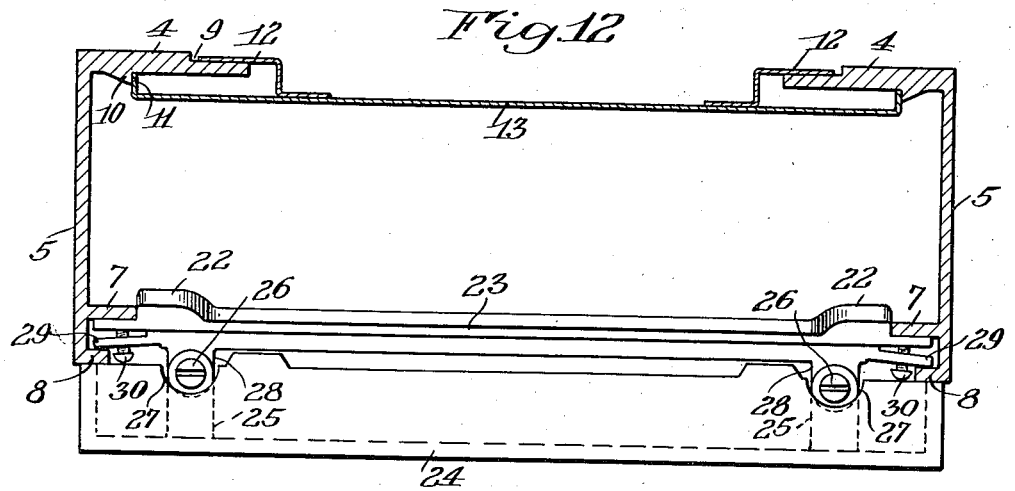
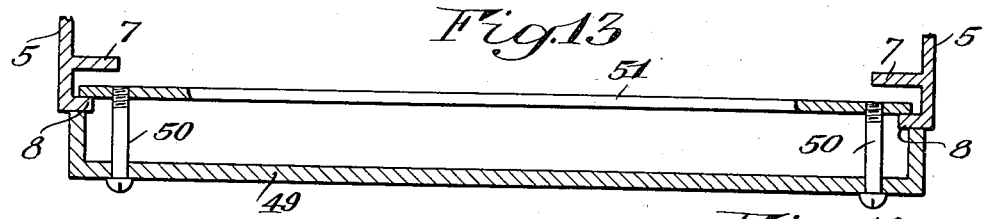
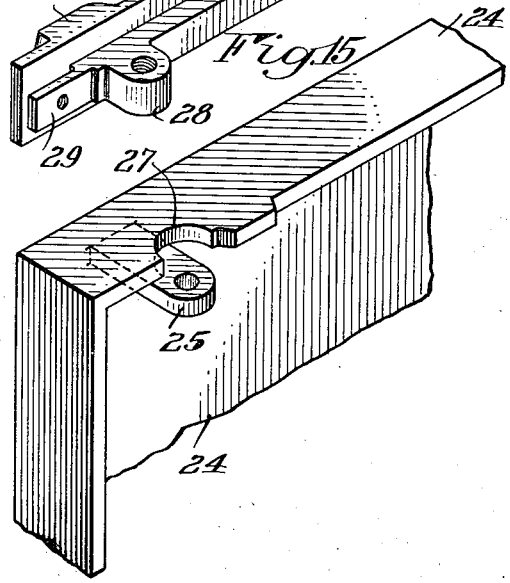
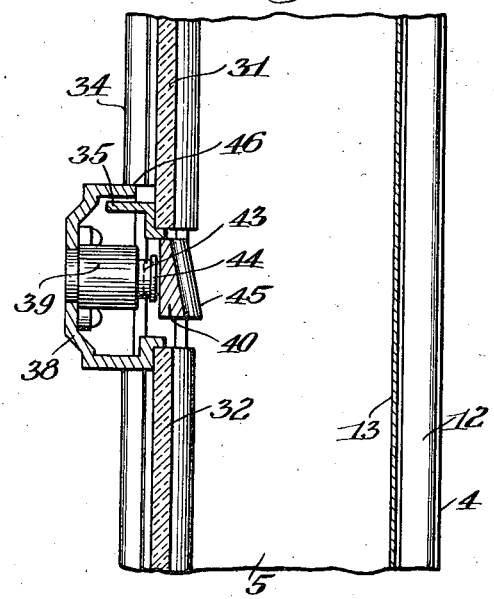
INVENTOR
George A. Bridgman
BY
his ATTORNEY Nov. 5, 1935.　　　G. A. BRIDGMAN　　　2,019,557
MAIL CHUTE
Filed March 30, 1934　　　7 Sheets-Sheet 6
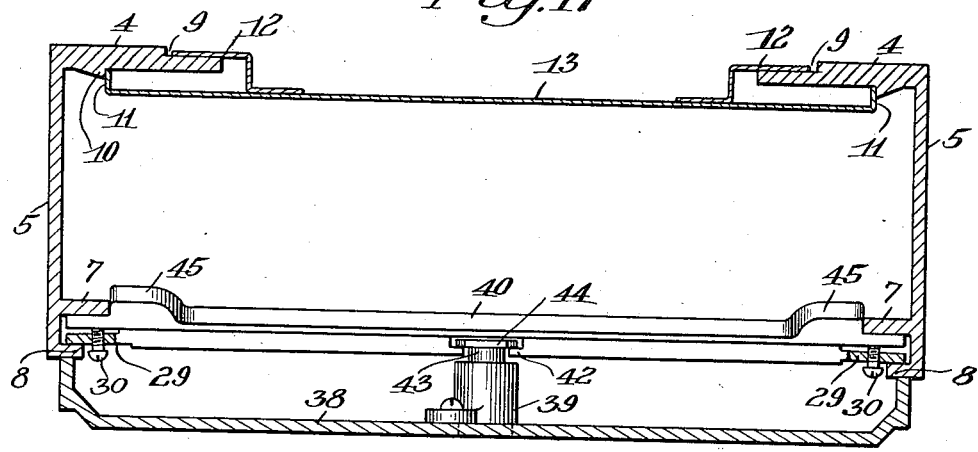
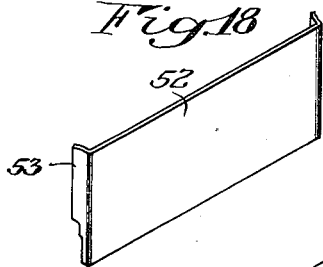
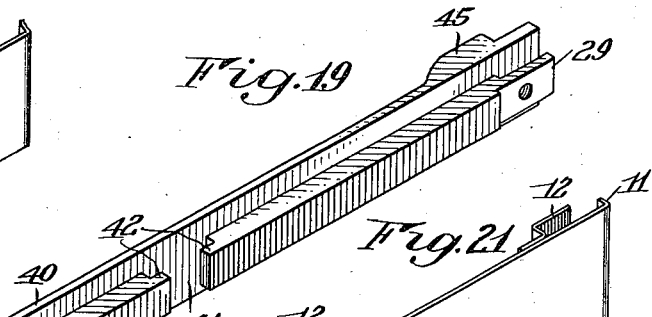
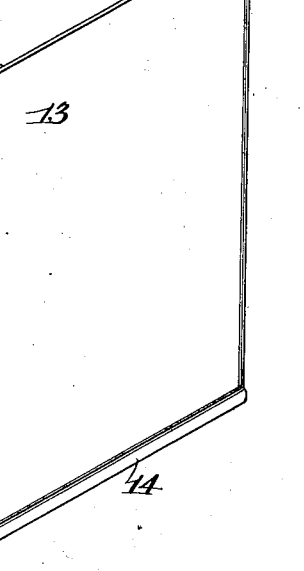
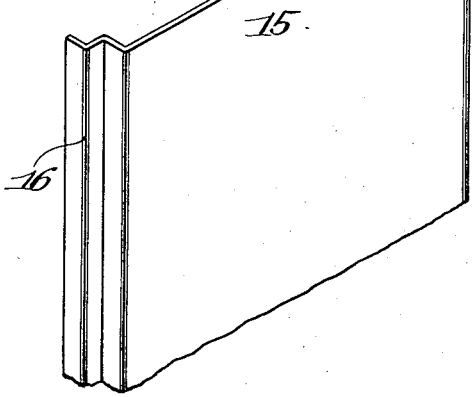
INVENTOR
George A. Bridgman
BY
his ATTORNEY Nov. 5, 1935.   G. A. BRIDGMAN   2,019,557
MAIL CHUTE
Filed March 30, 1934   7 Sheets-Sheet 7
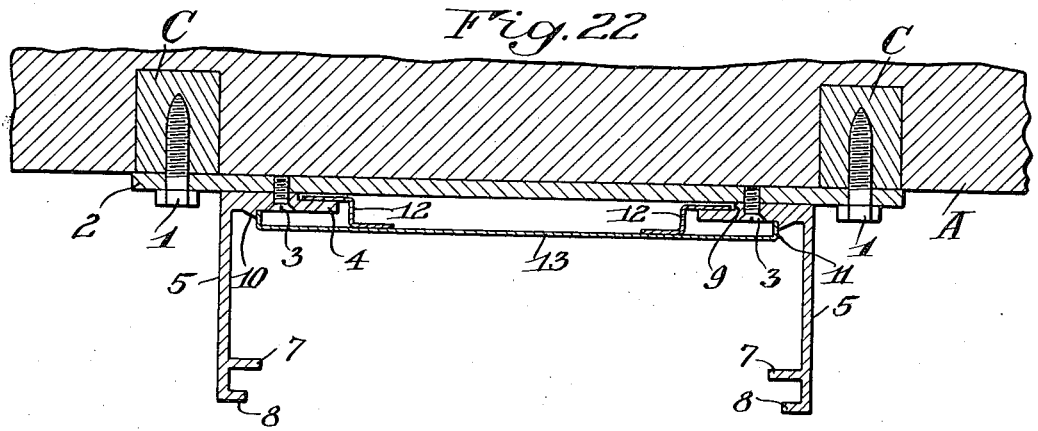
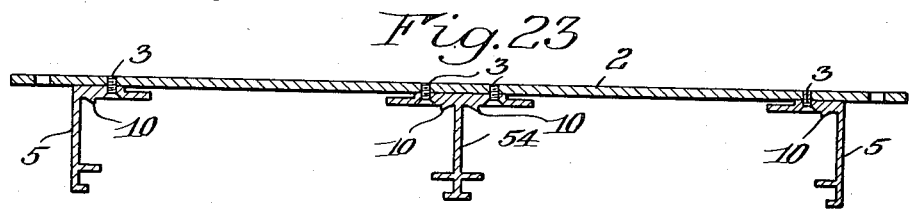
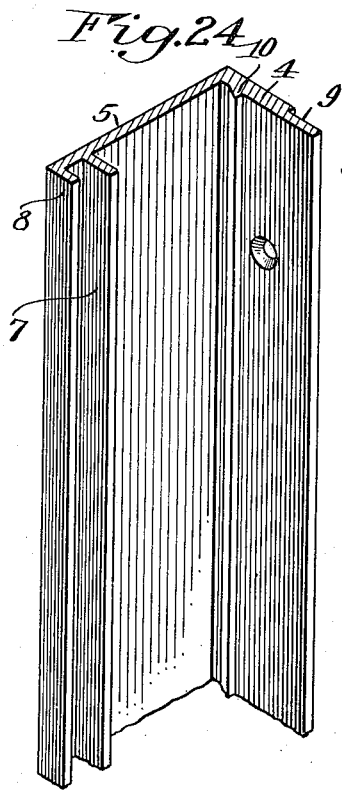
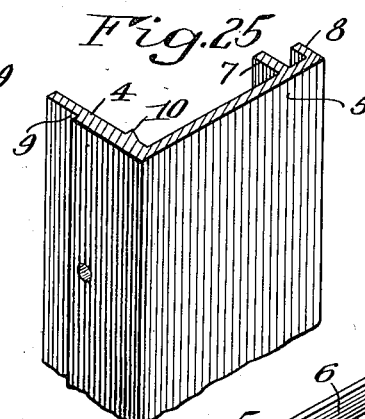
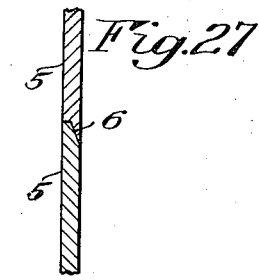
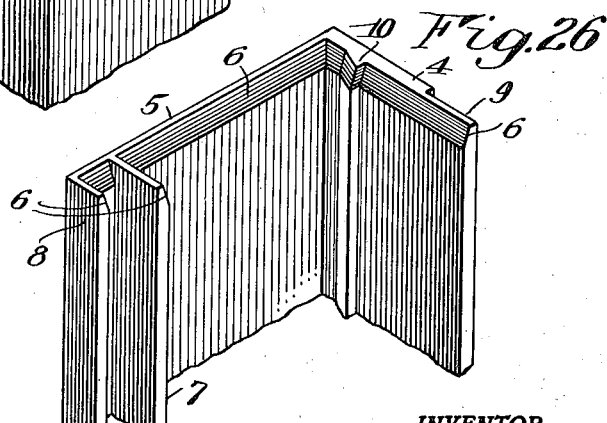
INVENTOR
George A. Bridgman
BY
his ATTORNEY Patented Nov. 5, 1935

2,019,557

UNITED STATES PATENT OFFICE 2,019,557

MAIL CHUTE

George A. Bridgman, Rochester, N. Y., assignor to Cutler Mail Chute Co., Rochester, N. Y., a corporation of New York Application March 30, 1934, Serial No. 718,230

23 Claims. (Cl. 193—8)

My present invention relates to mail chutes such as are used for conducting letters and other mail matter from upper floors to lower floors of buildings, and it has for its object to provide a simple and efficient chute of this character that will be relatively inexpensive in construction and installation and will be neat and pleasing in appearance. The improvements are directed in part toward so formng the chute and a method of so erecting it that this may accompany the finishing of the building itself in which the chute is located and become a built-in fixture harmonizing with and closely fitting the wall and floor structures instead of constituting an appliance later fitted in. The improvements are further directed to the provision of means for rendering the chute channel or letter conducting passage continuous though composed of successive superposed sections with adjustable fixtures whereby greater elasticity is provided in proportioning and fitting the usual removable or displaceable front panels between floors. To these and other ends, the invention resides in certain improvements and combinations of parts, all as will be hereinafter more fully described, the novel features being pointed out in the claims at the end of this specification.

In the drawings:

Fig. 1 is a front elevation of a mail chute constructed in accordance with and illustrating one embodiment of my invention, the same including the portion between two floors of a building and a fragment of a portion above the upper floor, the latter being fragmentarily shown in vertical section;

Fig. 2 is a similar view of a twin chute constructed along the same general lines;

Fig. 3 is an enlarged front elevation of the base portion above a floor and the ceiling cap portion below that floor, the floor itself being in vertical section in the plane of the front edge of the chute channel;

Fig. 4 is a vertical section taken substantially on the line 4—4 of Fig. 3;

Fig. 5 is an enlarged horizontal section taken substantially on the line 5—5 of Fig. 1, including a portion of the finished wall support;

Fig. 6 is an enlarged horizontal section taken substantially on the line 6—6 of Fig. 1;

Fig. 7 is an enlarged elevation of a fragment of the chute in open condition, showing in detail the cross bar with which the locking bar of one of the panel sections cooperates;

Fig. 8 is an enlarged vertical section through the supporting wall and floor of the building showing adjacent fragments of the chute in side elevation;

Fig. 9 is a fragmentary perspective view of one of the cross bars;

Fig. 10 is an enlarged perspective view of the front closure plate at the floor intersection;

Fig. 11 is a perspective view of a tensioning plate therefor;

Fig. 12 is an enlarged horizontal section taken substantially on the line 12—12 of Figs. 3 and 4 and showing the base section in top plan view;

Fig. 13 is an enlarged horizontal section through the ceiling cap taken on the line 13—13 of Fig. 3;

Fig. 14 is a fragmentary enlarged perspective view of the cross bar that cooperates with the base member;

Fig. 15 is a fragmentary perspective view of such base member, directionally reversed, however, with respect to Fig. 14;

Fig. 16 is an enlarged vertical fragmentary section through the panel locking bar taken substantially on the line 16—16 of Fig. 1;

Fig. 17 is an enlarged horizontal section through the locking bar on the line 17—17 of Fig. 1;

Fig. 18 is a perspective view of one of the elements of the ceiling cap piece;

Fig. 19 is an enlarged perspective view of the cross bar for the locking bar, otherwise shown in Fig. 7;

Fig. 20 is an enlarged fragmentary perspective view of the floor thimble;

Fig. 21 is an enlarged perspective view of one of the back wall plates;

Fig. 22 is an enlarged horizontal section through the side channels of the chute and a fragment of the wall support, substantially on the line 22—22 of Fig. 1 to illustrate the manner in which these channels are secured to the wall support;

Fig. 23 is a horizontal section through the side channels and their supporting plate in the twin chute construction of Fig. 2;

Fig. 24 is a fragmentary perspective view of one of the side channels viewed from the inside and enlarged;

Fig. 25 is a similar view taken from the back;

Fig. 26 is a view similar to Fig. 24 but showing the interlocking end conformation of the side channels, and Fig. 27 is a detail vertical section through said interlocking end connection.

Similar reference numerals throughout the several views indicate the same parts.

It has heretofore been the usual practice in fitting buildings with mail chutes to practically complete the building before the chute is installed leaving suitable openings through the floors, which openings are later patched up, and securing the assembled chute to the finished walls or to supports mounted thereon in sections between the floors, such sections being connected by specially devised floor sections that complete the continuity of the mail passage. In some instances, a niche or grove is left in the wall so that the chute will be inset instead of protruding from the wall surface, but the latter course required a clearance between the chute and the niche so that the wall could be finished before the installation, which clearance is objectionable because it is reached with difficulty for such purposes as cleaning and repainting. As stated, the chute section for each floor had to be designed and fitted accurately for that particular floor, all as an extraneous structure applied after the completion of the building wall.

The method and construction contemplated in my present invention involves an arrangement whereby the major portion or main body of the chute is installed concurrently with the fabrication of the wall and flooring so that the wall may be finished up to the chute, space conserved and a neater and more attractive appearance attained. To first give a general idea of how this is accomplished, after the rough base wall is in place, heavy side channels forming the permanent inner and outer side walls of the chute are fastened thereto in suitable laterally spaced relationship and in abutting superposed connection throughout the height of the building or the course of the chute therethrough. This is a permanent, rigid, accurately alined fabrication. The wall is then faced or otherwise finished as desired, as is the intersection with the floor. A separate back wall for the channel, if not theretofore applied, may now be added, together with the front walls between the floors made up of the usual removable panels and locking devices therefor. The panels are set upon or secured by cross bars connecting the side channels which, together with the locking means, are adjustable on the latter so that, within reasonable limits, absolute accuracy in the forming of the panels as to length is not required, the ceiling caps being also adaptable to inequalities of the same nature.

Referring more particularly to the drawings and first especially to Figs. 1, 5, 6, and 22 thereof, A represents the rough wall base of a building and B an intersecting floor thereof. The wall is provided at intervals with plugs C to receive screw bolts 1, by which transverse mounting plates or straps 2 are secured thereto. Secured to the mounting plates, as by screws 3 passing through the rear flanges 4 thereof, are the vertical side channels 5 properly spaced apart to constitute the permanent outer and inner side walls of the chute or letter passage. They are preferably of relatively heavy rolled metal and they are superposed in sections of convenient length one upon another against the wall A through the various floors B. Their proximate ends abut closely and are chamfered in a complementary manner, as indicated at 6 in Figs. 26 and 27 to provide a smooth, letter shedding interior surface. At their front edges, they are provided each with inwardly projecting inner and outer extruded spaced flanges 7 and 8, the latter being shorter than the former. These receive the cross bars and panels later described that close the front of the chute.

The rear flanges 4 of the side channels are provided with cut-away portions or grooves 9 on their back edges and continuous ribs or shoulders 10 on their front faces. As the sections are assembled or even after they are assembled, separate back wall sections 13, shown in detail in Fig. 21, are applied. These, as shown in said figure and in the horizontal sections, consist of metal plates of suitable length having rearwardly turned flanges 11 at their sides and outwardly turned spaced flanges 12 on their rear faces. They slide downwardly into place between the side channels 5 so that the flanges 12 lock into the cut-away portions 9 of channel flanges 4, while the side flanges 11 abut the shallower shoulders 10 thereon. This makes a tight letter shed joint on the interior, presenting angles that it is impossible for the edges of mail matter to find, while at the bottom the edges of the plates 13 are offset inwardly at 14 to overhang the upper edge of the companion plate next below and produce a letter shed, as shown also in Fig. 4. The flanges 12 may consist of separate sheet metal strips spot-welded on the plates.

Where the chute so formed passes through the flooring B (Figs. 3, 4, and 6), it is spaced and protected from the latter at the front by a thimble 15 consisting of a vertical plate flanged to fit at 16 the forward corners of the side channels. In fact, the latter may be erected upon the base wall A before the flooring is even laid, the floor being filled in around them with the aid of thimble 15.

Assuming, for the purposes of illustration and description, that the base wall A is to be supplemented by a finishing wall of plaster D and a facing of marble E, as best shown in Figs. 5 and 8, these may be applied at any time after the side channels 5 are in place and brought up to a neat and exact meeting therewith at the two sides. In this way, the chute may be built flush with the finished wall, if desired, being roughly inset into base wall A, if necessary.

Returning to the region of the flooring B, the front of the chute is closed and completed as a passage by a floor section 17 consisting of a metal plate, shown in detail in Fig. 10, the same being provided with an embossed portion near each edge forming a shoulder 18 and a flange 19. This plate is narrower than the distance between the flanges 8 of the side channels 5 but wider than the distance between the companion flanges 7 so that it may be inserted from above or below with the shoulders 18 engaging the edges of the flanges 7 and the flanges 19 stopping against the front of the flanges 8 resulting in a safety letter shed similar to that of the back wall. This floor section plate is held in place by the tension of a bowed spring plate 20, shown in detail in Fig. 11, which is slid into place in front of it to react at its edges against the flanges 8 of the side channels, as clearly shown in Figs. 4 and 6, leaving a space between it and the floor thimble 15. Its lower edge rests upon a cross bar 21 connecting the side channels 5 near the ceiling of the floor below, while its upper edge is engaged by letter shed lugs 22 on a cross bar 23 connecting the side channels just above the floor line of the floor above so that the plate is further confined positively between these two elements. In case of a clog of mail in the chute at the floor level this floor section plate 17 may be removed from above through the front of the chute to dislodge it, as will appear from the following explanation of structure.

A rectangular casing 24 (Figs. 4, 12, and 15) forming a base rests upon the floor B to finish off the chute as exposed on that floor at the bottom. It is provided internally with a pair of rearwardly extending lugs 25 through which extend screws 26 made accessible by notches 27 on the top of the base, which screws are threaded into forwardly extending lugs 28 near the ends of the cross bar 22 and support the latter in a sense, although at the same time the cross bar secures the base in place on the side channels 5, it being borne in mind that the perspectives of Figs. 14 and 15 are directionally reversed. To this end, the ends of the cross bar 23 are provided with bifurcated portions 29 that engage between the flanges 7 and 8 of the side channels 5, as shown particularly in Fig. 12, and are adjustable vertically therein. When so adjusted at the proper point, they are secured fixedly in position by screws 30 threaded through one portion and reacting against the other to expand them in place. It may be said at this point that all of the cross bars, including the one 21 previously described, are secured in the same manner though only the base bar 23 is shown in detail in this respect.

Above the base plate and between the floors, the front of the chute is closed by the usual upper and lower removable panels 31 and 32, the latter provided with letter drops or mailing openings 33 that may be of the usual or any preferred type, through which the mail matter is introduced to fall to the collecting receptacle below. These panels, as shown by the vertical and horizontal sections of Figs. 4 and 5, consist of heavy glass plates 31 held between moldings 34 at the sides connected by flanged cross pieces 35 at top and bottom to constitute a rigid frame. A squared portion 36 on the two moldings fits tightly but detachably between the flanges 8 of the side channels whereby it is inset to abut the flanges 7 with the joint protected to shed letters by the inwardly protruding portion 37 of the molding body on the inside.

The cross piece 35 of the lower panel 32 rests upon the top of the base 24, locks behind it and at the same time the flange thereof covers the notches 27 and makes the screws 26 inaccessible so that the base can not be removed and entrance to the interior gained by marauding or unauthorized persons. At the upper end of this particular panel, a locking bar 38 takes the place of the other cross pieces 35 in forming the molding frame, being rigidly united with the moldings and coming off with the panel. It is in the form of a shallow casing having a key controlled lock barrel 39 of a familiar type at its center. Opposite to it is another cross bar 40, shown in detail in Fig. 19, adjustable on but rigidly connecting the side channels to which its bifurcated ends are secured in the same manner as previously explained with reference to the base cross bar 23. A central notch or opening 41 with undercut adjacent shoulders 42 at the center of this cross bar receives the rearwardly projecting barrel (Figs. 16 and 19) 43 of the locking bar lock 39 on which a suitably formed bolt 44 is engaged with or disengaged from the shoulders 42 upon the rotation of the lock by authorized persons with the key.

The cross bar 40 is provided with letter shed lugs 45 protecting the upper edge of the panel frame 32. The lower cross piece 35 rests upon cross bar 40 and its flange is locked within the shell of the locking bar 38, that is, the lower cross piece 35 of the upper panel 31 so rests and adjacent thereto the upper molding is notched at 46 so that the locking bar and lower panel can not be raised together to disengage the bottom of the latter from its interlock with the base 24. Thus, both panels are held against removal by the same lock provided the upper panel can not be pushed up. This is taken care of in the following manner:

The ceiling piece cross bar 21 previously described has a forward depending flange (Fig. 4), behind which the cross piece 35 of the upper panel frame 31 interlocks. This flange is in the present form of two offset lugs 47 on its front face, letter shed lugs 48, by the way, on its rear face protecting the upper edge of the upper panel, as shown in detail in Fig. 9, where the customary mode of fastening the cross bar adjustably also appears. See also Fig. 3. A ceiling cap piece of the form best shown in Figs. 3, 4, and 13 and indicated at 49 has the form of an ornamental hollow frame, the rear of which rests against the side channels 5 or the flanges 8 thereof. It abuts the ceiling tightly and is clamped in place by bolts 50 threaded into a bridge piece 51 locking adjustably on the inner sides of flanges 8. A skirt, shown in detail in Fig. 18, and consisting of a plate 52 having flared lateral spring flanges 53 is sprung in between the side channel flanges 8 and pushed up into the cap piece 49. It rests at the front against the lugs 47 of the cross bar 21 and at its lower edge upon the flange 35 of the top cross piece of the upper panel 31, thus completing the finishing fitting and interlocking of all parts between floor levels.

It will thus be seen that, as first stated, the main body or channel of the chute is continuous so that no accurate fitting is required between floors; no pre-designed accurate positioning of the cross bars 21, 23, and 40 is necessitated, because these are all readily adjustable as to height to produce tight joints with the panels, and the flexibility of cooperation of the parts in the region of the ceiling piece 49—52 takes care of variations resulting from only approximate measurements for fabricating the front panels themselves.

The invention is similarly applicable to the twin chutes that have lately come into general use in order to provide uninterrupted service and which are illustrated in Fig. 2. Referring also to Fig. 23, it will be seen that the side channels 5 on the outer sides of both chutes are provided exactly as before, except that the mounting plate 2 is, of course, longer. A common inner wall for both chutes is provided at 54, which is the equivalent of placing two side channels back to back, except that the element is made in one piece. Neither the method nor other elements of construction is altered.

It is to be understood that with respect to some features of my invention, as set forth in the appended claims, it is immaterial whether the side channels 5 are connected by a separate or an integral back 17.

I claim as my invention:

1. A method of erecting mail chutes which comprises mounting separate superposed side channels in spaced relationship upon a wall base and through successive floors of a building, facing the wall up to the channels on both sides so that they become inset into the facing material and then adding a back wall to the chute.

2. A method of erecting mail chutes which comprises mounting separate superposed side channels in spaced relationship upon a wall base and through successive floors of a building, facing the wall up to the channels on both sides so that they become inset into the facing material and then adding back and front walls to the chute.

3. A method of erecting mail chutes which comprises permanently mounting side channels in sections upon a wall base one upon the other progressively and continuously upwardly through the floors of a building, finishing the wall and floors, and thereafter adding front and rear walls to the channels to complete a closed chute.

4. A method of erecting mail chutes which comprises mounting side channels in sections upon a wall base one upon the other progressively upwardly through the floors of a building so that their proximate ends abut and they constitute continuous side walls, finishing the wall and floors, and thereafter sliding a rear wall in superposed sections between the side channels.

5. In a mail chute, the combination with a support and two separate vertical side channels directly mounted fixedly thereon in spaced relationship, of a sheet metal back wall independent of the fixed mounting embodying a plurality of superposed longitudinally abutting sections slidably assembled upon and between and interlocking with the side channels independently of the fixed mountings and sectional means closing the front of the chute.

6. In a mail chute, the combination with a support and two separate vertical side channels directly mounted fixedly thereon in spaced relationship and provided with guiding flanges, of a sheet metal back wall embodying a plurality of superposed longitudinally abutting sections slidably assembled upon and between and interlocking with the guiding flanges of the side channels.

7. In a mail chute, the combination with a support and two side channels mounted thereon in spaced relationship and provided with guiding flanges having ways on their rear sides and shoulders on their forward sides, of a sheet metal back wall embodying a plurality of superposed sections slidably assembled between the side channels, said sections embodying flanges at the rear cooperating with the ways and flanges at the front cooperating with the shoulders to constitute a mail shed on the inside of the chute.

8. In a mail chute, the combination with a support, two continuous side channels mounted thereon in spaced relationship and a continuous but separate back connecting the channels at the rear, of a floor section embodying a detachable plate connecting the side channels at the front and completing a closed letter conveying passage.

9. In a mail chute, the combination with a support, two continuous side channels mounted thereon in spaced relationship and a continuous but separate back connecting the channels at the rear, of a floor section embodying a detachable plate connecting the side channels at the front and completing a closed letter conveying passage, and a tensioning device holding the plate in place.

10. In a mail chute, the combination with a support, two continuous side channels mounted thereon in spaced relationship and a continuous but separate back connecting the channels at the rear, the front edges of the side channels being provided each with an inwardly turned flange, of a floor section embodying a detachable plate connecting the side channels at the front and cooperating with the flanges to constitute a letter shed and completing a closed letter conveying passage.

11. In a mail chute, the combination with a support, two continuous side channels mounted thereon in spaced relationship and a continuous but separate back connecting the channels at the rear, the front edges of the side channels being provided each with a pair of inwardly turned flanges, of a floor section embodying a detachable plate connecting the side channels at the front and cooperating with the rearward flanges thereof to constitute a letter shed and completing a closed letter conveying passage and a tensioning plate cooperating with the forward flanges of the side channels and engaging the first mentioned plate to hold it in place.

12. In a mail chute, the combination with a building embodying a wall support and a floor having an opening therein, of a pair of spaced continuous side channels mounted on the wall support and extending through the floor, a thimble cooperating with the side channels to space them from the floor at the front, a plate connecting the side channels at the front to complete a letter shedding passage at the floor level and independently removable at one side of the floor, and displaceable panels closing the front of the chute between the side channels above and below the floor.

13. In a mail chute, the combination with a building embodying a wall support and a floor having an opening therein, of a pair of spaced continuous side channels mounted on the wall support and extending through the floor, a thimble cooperating with the side channels to space them from the floor at the front, a plate connecting the side channels at the front to complete a letter shedding passage at the floor level and independently removable at one side of the floor, detachable cross bars connecting the side channels above and below the plate and cooperating with the latter, and displaceable panels closing the front of the chute between the side channels above and below the floor.

14. In a sectional mail chute, the combination with side channels, of a floor section detachably connecting the channels at the front and cross bars detachably connecting the channels at the front above and below the floor section and adapted to confine the floor section at a floor level.

15. In a sectional mail chute, the combination with side channels, of a floor section detachably connecting the channels at the front, a cross bar detachably connecting the channels at the front above the floor section and cooperating with the latter, a floor base connected to the cross bar, and a displaceable panel for the front of the chute resting upon the floor base.

16. In a sectional mail chute, the combination with side channels, of a floor section detachably connecting the channels at the front, a cross bar detachably connecting the channels at the front below the floor section and supporting the latter, a ceiling cap covering the joint between the floor section and the cross bar, and a displaceable panel for the front of the chute cooperating with the cross bar.

17. In a sectional mail chute, the combination with side channels, of a floor section detachably connecting the channels at the front, a cross bar detachably connecting the channels at the front below the floor section and supporting the latter, a ceiling cap covering the joint between the floor section and the cross bar, and a displaceable panel for the front of the chute cooperating with the cross bar, the ceiling cap embodying an outer element secured to the side channels and an inner element also cooperating with the panel.

18. In a sectional mail chute, the combination with a plurality of superposed chute sections open at the front, of cross bars slidably engaging and vertically adjustable on the chute section at the front, and removable panels closing the front of the chute and cooperating with said cross bars.

19. In a sectional mail chute, the combination with a plurality of superposed chute sections open at the front, of cross bars vertically adjustable on the chute section at the front, and removable panels closing the front of the chute and cooperating with said cross bars, the sides of the chute sections being provided with inwardly turning flanges and the cross bars being provided with expanding devices adapted to be locked therewith at different points of elevation.

20. In a sectional mail chute, the combination with a plurality of superposed chute sections open at the front, of a cross bar vertically adjustable on the chute section at the front, a displaceable front panel closing the chute at the front, and a key controlled locking bar on the panel having a locking engagement with the cross bar.

21. In a sectional mail chute, the combination with a plurality of superposed chute sections open at the front, of a cross bar vertically adjustable on the chute section at the front, a displaceable upper front panel closing the chute at the front and resting upon the cross bar, a similar lower front panel, and a key controlled locking bar on the lower panel having a locking engagement with the cross bar and adapted to also interlock with the upper panel to prevent its displacement.

22. In a mail chute, the combination with two side channel walls each having a pair of inwardly turned forward flanges of which the outer is shorter than the inner, of a panel closing the front of the chute and embodying moldings sitting within and between the said outer flanges and against the inner flanges.

23. In a building construction, the combination with a wall and floors intersecting the same, of a mail chute embodying continuous uninterrupted letter conducting side walls secured to the building wall and encased by the floors at their intersections therewith, the building wall being provided with a permanent facing of substantial thickness brought up to abutment with the said side walls of the chute so that the latter, as a whole, is imbedded in the building wall, and displaceable and replaceable front panels for the chute between floors, said front panels being separate from the side channels and the latter being permanently fixed to the building wall.

GEORGE A. BRIDGMAN.